(12) United States Patent
Berkau et al.

(10) Patent No.: US 7,186,772 B2
(45) Date of Patent: Mar. 6, 2007

(54) COATING COMPOSITION FOR FORMING SELF-LAYERING OR SELF-COATING LACQUER SYSTEMS

(75) Inventors: Reinhold Berkau, Ulm (DE); Michael Gailberger, Ulm (DE); Thomas Gruber, Neu-Ulm (DE); Karl Holdik, Ulm (DE); Georg Meichsner, Esslingen (DE); Fritz Mezger, Schoenaich (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/672,372

(22) Filed: Sep. 26, 2003

(65) Prior Publication Data

US 2004/0127593 A1 Jul. 1, 2004

(30) Foreign Application Priority Data

Sep. 27, 2002 (DE) ................. 102 45 201

(51) Int. Cl.
*C08J 3/02* (2006.01)
*C08J 3/03* (2006.01)
*C08J 3/07* (2006.01)
*C08J 3/28* (2006.01)

(52) U.S. Cl. .............. 524/501; 524/502; 524/505; 524/507; 524/508; 524/510; 524/509; 524/800; 524/804; 524/805; 524/806; 524/837; 524/845; 524/500; 522/84; 522/86; 522/100; 522/90; 522/96; 522/108; 522/110; 522/111; 522/112; 522/109; 427/508; 427/512; 427/517; 427/289; 427/401; 427/388.4; 428/332; 428/333; 428/334; 428/341; 525/228; 525/227; 525/191

(58) Field of Classification Search ........... 525/228, 525/191, 227; 524/500, 501, 502, 504, 505, 524/800, 804, 805, 806, 837, 845, 507; 522/84, 522/85, 86, 90, 104, 100, 108; 428/332, 428/333, 334, 341; 427/508, 512, 517, 283, 427/401, 388.4

See application file for complete search history.

(56) References Cited

U.S. PATENT DOCUMENTS 3,823,205 A * 7/1974 Zimmit ................ 525/228

| 4,246,368 | A | 1/1981 | Murase | 525/117 |
| 4,305,994 | A | 12/1981 | Murase | 428/411 |
| 4,312,902 | A | 1/1982 | Murase et al. | 427/386 |
| 4,345,004 | A | 8/1982 | Miyata et al. | 428/416 |
| 4,916,019 | A | 4/1990 | Nakatani et al. | 428/418 |

FOREIGN PATENT DOCUMENTS

| DE | 2821012 | 11/1978 |
| DE | 3008825 | 9/1980 |
| DE | 3030116 | 2/1981 |
| DE | 3117302 | 3/1982 |
| DE | 3702503 | 7/1987 |
| EP | 1038935 | 9/2000 |
| GB | 1570540 | 7/1980 |
| GB | 2046765 | 11/1980 |
| GB | 2192399 | 1/1988 |
| WO | 9920702 | 4/1999 |

OTHER PUBLICATIONS

W. Funke "Preparation and properties of paint films with special morphological structure" in J. Oil Col. Chem. Assoc. 1976, 59, pp. 398-403.
W. Funke "Organische Beschichtungsstoffe in Forschung und Entwicklung" in Industrie-Lackier-Betrieb 44 (1976), No. 8, pp. 305-314 (see specification for English language description).
Carr et al. "Theoretical aspects of self-stratification" in Progress in Organic Coatings, vol. 28, Issue 3, Jul. 1996, pp. 161-171 (abstract).
Walbridge "Self-stratifying coatings—an overview of a European Community Research Project" in Progress in Organic Coatings, vol. 28, Issue 3, Jul. 1996, pp. 155-159 (abstract).

* cited by examiner

*Primary Examiner*—Sanza L. McClendon
(74) *Attorney, Agent, or Firm*—Davidson, Davidson & Kappel, LLC

(57) ABSTRACT

Self-coating or self-layering lacquer systems from at least two different resins, oligomers, or polymers, which are emulsifiable or dispersible in water, have different surface tensions, and form self-layering phases. After the application, the phases separate into the components of the formulation.

13 Claims, 1 Drawing Sheet

COATING COMPOSITION FOR FORMING SELF-LAYERING OR SELF-COATING LACQUER SYSTEMS

Priority is claimed to German Patent Application No. DE 102 45 201.6-43 filed on Sep. 27, 2003, the entire disclosure of which is incorporated by reference herein.

BACKGROUND

The present invention relates to coating compounds for forming self-coating or self-layering (self-stratifying) lacquer systems, for use in particular in the automobile industry, as well as a method for manufacturing these coating compounds.

Surfaces or coatings for parts or components of transportation means, for example motor vehicles, airplanes, rail-mounted vehicles, etc., must satisfy extreme demands with respect to corrosion protection, scratch resistance, optics, coloring, chemical resistance, and resistance to other possible environmental effects.

This places great demands on the materials utilized, which must at the same time be manufactured cost-effectively. This is particularly true in the automobile industry, where parts manufacturing processes are highly competitive and where the coating materials and their methods of application must satisfy increasing environmental compatibility demands.

Coating materials that are able to cope with strict environmental standards, especially in regard to avoiding the need for organic solvents that are manufacturable and usable cost-effectively have therefore long been sought. This also includes self-stratifying coating compositions, which are based both on incompatible resin powder mixtures and on incompatible lacquer resins, dissolved in organic solvents.

Such compositions were described for example in a publication that appeared in the periodical Industrie-Lack 44 (1976), No. 8, page 305. Additional examples can be found in the XV. FATIPEC Congress Book, II (1980), 387 or in the periodical, Progress in Organic Coatings (1996), 30 Jul., a special edition devoted to self-stratifying coatings. So as to avoid mere repetition of each of these three disclosures, they are incorporated in their entirety into the present application, in particular with regard to the materials and manufacturing processes for self-stratifying compositions.

The basics of self-layering lacquer systems based on incompatible powder mixtures and on incompatible lacquer resins dissolved in organic solvents are likewise described in the publications mentioned above, as well as in the research report of the Paint Research Association "Self-Stratifying Coatings" March 1995.

British Patent GB 2 046 765 describes self-coating compositions based on powdered paint resins and film-forming resins in organic solvents, which produce multilayered film coatings.

A powder coating process is described in British Patent Application GB 1 570 540 which can be produced using multilayered coatings. Further publications, which describe the manufacture of multilayered coatings using powdered coating compositions are German Patents DE 28 21 012 C2, DE 30 08 825 C2, and DE 30 30 116 C2, and U.S. Pat. No. 4,305,994. All these publications deal with processes for manufacturing coating compounds that may be utilized for various purposes. German Patent 31 17 302 C2 describes a process for manufacture of a multilayered olefinic resin film on a metal substrate.

However, a disadvantage of all these processes is that as a result of their high viscosity the two powder lacquers separate only slowly from the melt, and extremely high temperatures are needed for the two incompatible molten powder coatings to be able to separate. The cycle times for separation achievable with this lacquer system make an application as self-layering (self-stratifying) or self-coating lacquer systems, on the basis of two incompatible powder lacquers, impossible for mass production in the automobile industry.

A further disadvantage is the high temperature that is necessary for effective separation; therefore, with the different substrate materials utilized in building automobiles, ranging from steel to low melting thermoplastics and mixtures thereof, such a composition cannot be used.

British Patent GB 2 192 399 describes coating compositions, which are mixtures of copolymers in organic solvents. The copolymers used are fluorine- or silicone-containing copolymers having active hydrogen, and acrylate copolymers having active hydrogen in various mix ratios. Although this publication describes use of these compositions for automobile lacquering, their use is very doubtful based on pollution control considerations, since extremely poisonous organic solvents such as xylene, methylisobutyl ketone, or Solvesso 100 or 150 (a $C_{10\text{-}15}$ aromatic mixture) are utilized, and formulations which are obtained are of critical environmental concern. The same is true for the coating compositions described in European Patent Application EP 1 038 935 A1 (WO 9920702 A1).

The use of different self-coating resin systems based on organic solvents which were described in the March 1995 research report by the Paint Research Association "Self-Stratifying Coatings" and which are described in the results of the same named BRITE/EURAM research project of the same name from 1989–1993, are likewise questionable on the grounds mentioned above.

German Patent DE 37 02 503 C23 describes a method for formation of a multilayered film on a substrate, wherein a cationically-depositable, epoxy-type electrocoating material, following neutralization with a suitable acid forms an aqueous bath suitable for cationic deposition, is mixed with a non-ionogenic film-forming acrylic, polyester resin, polyester-modified resin, or silicone-modified resin and is introduced into an electrodeposition bath. An electrically conductive object is immersed in the bath and is used as the cathode. A film is deposited under the conditions described, and is finally hardened at 150–230° C. to form a multilayered film.

This coating system should function as a corrosion protection base or primer for subsequent lacquer build-up (protective paint; base coat and clear lacquer). Such a coating material is not, however, suitable as a post-primer for automobiles, because due to the various colors an immersion-based process is not practicable, since for each color a separate coating bath having the desired dipping lacquer must be available. Aside from that, the epoxide systems, which are used do not meet the stability requirements necessary in protective painting in automobile construction.

Two known coating lacquers in vehicle lacquering are described below as examples of a sequence of coatings having different functions, it being impossible to list all possibilities regarding variants and alternatives in the lacquering operation and the construction of multilayered systems for different substrate materials such as steel, plastic, and light metal. One possibility of lacquering is to phosphatize a substrate layer, then to treat this pre-treated material with a cathodic immersion lacquer, coat it with a filling material, apply a base lacquer coat and subsequently to provide a clear lacquer.

Another possibility for forming a lacquer coating is to coat a phosphatized substrate coat likewise with a cathodic dipping lacquer and then to apply a layer of a hydrated filler material and subsequently treat with a pigmented protective paint. These incompatible lacquer systems based on powder resin mixtures or on organic solvents are known as self-stratifying coatings.

All processes known to date, however, have in common that they either are not applicable to the automobile industry or cannot be used due to environmental concerns. There is therefore a great demand for a lacquer system that can be utilized universally based on the use of water as solvent. However, none of the attempts that have been made to date to develop a coating composition based on water have been successful.

Self-coating or self-layering (self-stratifying) coating compositions for manufacturing multilayer coatings have a series of characteristics of considerable economic and environmental interest.

SUMMARY OF THE INVENTION

An object of the present invention is to provide self-layering (self-stratifying) or self-coating lacquer systems, which:

1. permit the use of different substrate materials;
2. satisfy environmental protection needs;
3. satisfy the automobile industry's requirements in regard to surfaces, quality and finish, and additionally; and/or
4. lower the costs of lacquering in mass production.

A coating composition for formation of self-layering or self-coating lacquer systems comprising at least two different resin, oligomer, and/or polymer components emulsified or dispersed in water, each having different surface tensions, wherein one of the components is radiation-hardenable, and the difference in the surface tensions of at least two of the components is greater than 5 mN/m. In one variation of this coating composition, the water-emulsified and/or dispersed components may be dried thermally, or hardened by radiation, in particular UV radiation, NIR radiation, IR-radiation, or microwave drying.

Surprisingly, it has been found that the objects are achievable using water-based lacquer systems. According to the present invention, such a self-coating or self-layering lacquer system is based on at least two different water-emulsifiable or dispersible resins, oligomers, or polymers which in each case have different surface tensions and form self-coating phases. After application of the coating composition the components of the formulation separate during hardening to form layers of macroscopically measurable proportions.

In a variation of the self-coating or self-layering lacquer system, one emulsifiable or dispersible component is a clear lacquer coat having a thickness of 1 μm to 100 μm and the other component is a coloring base coat having a thickness of 5 μm to 100 μm. In a further variation of the self-coating or self-layering lacquer system, one emulsifying or dispersible component is a filler material and the other component is a base coat, or alternatively the system may have a filler material and a protective paint coat.

It is particularly advantageous that at least two layers having different application functions, such as for example coloring and scratch resistance or coloring and weather resistance, can be applied to the coated body in a single step. This applies in particular to applications in which there are several layers having different functions for the entirety of all surface characteristics such as for example scratch resistance, color, resistance to impact by stones, corrosion protection, and so forth.

In contrast to the use of additives that are added in small amounts to lacquer formulations, for example wetting and reaction-influencing additives, these additives also migrate to the interfacial boundaries, but influence only marginally the solid state properties of the lacquer film. The lacquer film's properties are determined essentially by the cross-linked and set resin molecules. It is impossible to achieve development of self-layering lacquers using this method.

Although the diffusion of the lacquer resin molecules, which is necessary for separation and subsequent coating, self-stratifying lacquer systems based on organic solvents are supported by Benard cells, which contribute to an acceptable time for the separation to occur, it has been impossible to confirm such Benard cells when using such water-based compositions (see research report of the Paint Research Association, "Self-Stratifying Coatings" March 1995, page 51).

Independently of the formation of Benard cells, the self-coating or self-layering coating compositions are based, according to the present invention, on the dispersion or emulsion of the utilized components, which are hardened after further use thermally or by radiation and so the process of phase separation may begin with different surface tensions. For that reason the aqueous and radiation-hardenable self-stratifying coating compositions which are usable without addition of organic solvents are suitable for coating two- and three-dimensional bodies, in particular vehicles and vehicle parts. In this connection it should be understood that the concept of the self-coating of a coating composition includes by definition the development of two discrete layers as well as the build-up of concentration gradients. This means that the concentrations of the components of the composition increase or decrease in the form of gradients with respect to the cross-section of the coating.

The aqueous or water-based coating compositions, according to the present invention, are applied both thermally and also as radiation-settable self-stratifying coating compositions, one layer-forming component preferably being radiation hardenable (dual- or monocure-lacquer). The solvent-free binder material and the oligomers, polymers, or resin, which are emulsified or dispersed in water prior to processing, form self-layering phases in combination. Such systems are dried thermally by means of NIR or IR radiation, UV or microwaves.

A prerequisite for the manufacture of self-stratifying coating compositions is the incompatibility of the resins, which separate into discrete phases as a result of their different surface tensions, when they are emulsified or dispersed in water, after application of the coating compounds onto the substrate.

The coating compositions according to the present invention contain, as one component, oligomers or resin molecules or polymers that have a low surface tension; an oligomer or resin molecule or polymer whose surface tension is different from the surface tension of the first compound is utilized as second component.

This is true especially for fluorine-containing and silicon-containing resin molecules (siloxanes and silanes), which form surfaces that have a low surface tension. The choice of materials is, however, not restricted to the above-mentioned materials; other materials including alkyd resins, aminoplasts, epoxy resins, phenolic resins, polyurethane resins, polyester resins, polyvinyl acetate, amine resins, or other materials which form surfaces having a lower surface tension may be utilized in the same way. The resins that are utilized should have surfaces with a surface tension of less than 40 mN/m. Resins that have a surface tension between 20 and 35 mN/m are preferred.

The choice of resin is thus not limited to pure resins. If hardening of the resin molecule requires a second reaction partner, as in 2-component lacquers, for example, in isocyanate-polyol cross-linking or epoxy-amine cross-linking, mixtures having suitable hardeners are also suitable. The materials selected are likewise dispersed/emulsified in water.

The dispersions that have been prepared are mixed with a second aqueous resin dispersion/emulsion that should be separated from the first-mentioned resin. These resins should form surfaces having surface tensions greater than 36 mN/m.

The selection criterion for the combination of the two resins is the difference between the surface tensions of the two resins. This difference should amount to at least 5 mN/m, preferably 10 mN/m. Mixing of the two self-separating resins, may be carried out either in the application unit, as in the case of 2-K clear lacquers of the isocyanate-polyol type, or after preparation of the lacquer.

For chemically cross-linking lacquers this is primarily dependent on the cross-linking mechanism of the materials which influences the pot life or storage stability. Where a reactive system is concerned, the materials are mixed no sooner than in the application unit or must be utilized alternatively in their blocked form. This procedure is familiar to those skilled in the art and known for example from blocked isocyanates. In no case should chemical lacquer materials be allowed to cross-link prior to their separation.

It is especially advantageous here to use at least one radiation-hardenable dispersion/emulsion which cross-links by the radical mechanism, in particular as a clear lacquer layer. In this case, cross-linking can be accomplished with UV radiation after layer separation has taken place. Moreover, the radical polymerization may also be initiated by thermal activation by addition of a suitable radical starter.

BRIEF DESCRIPTION OF THE DRAWING

The present invention is described below with reference to the drawing, in which.

DETAILED DESCRIPTION

Figure 1:
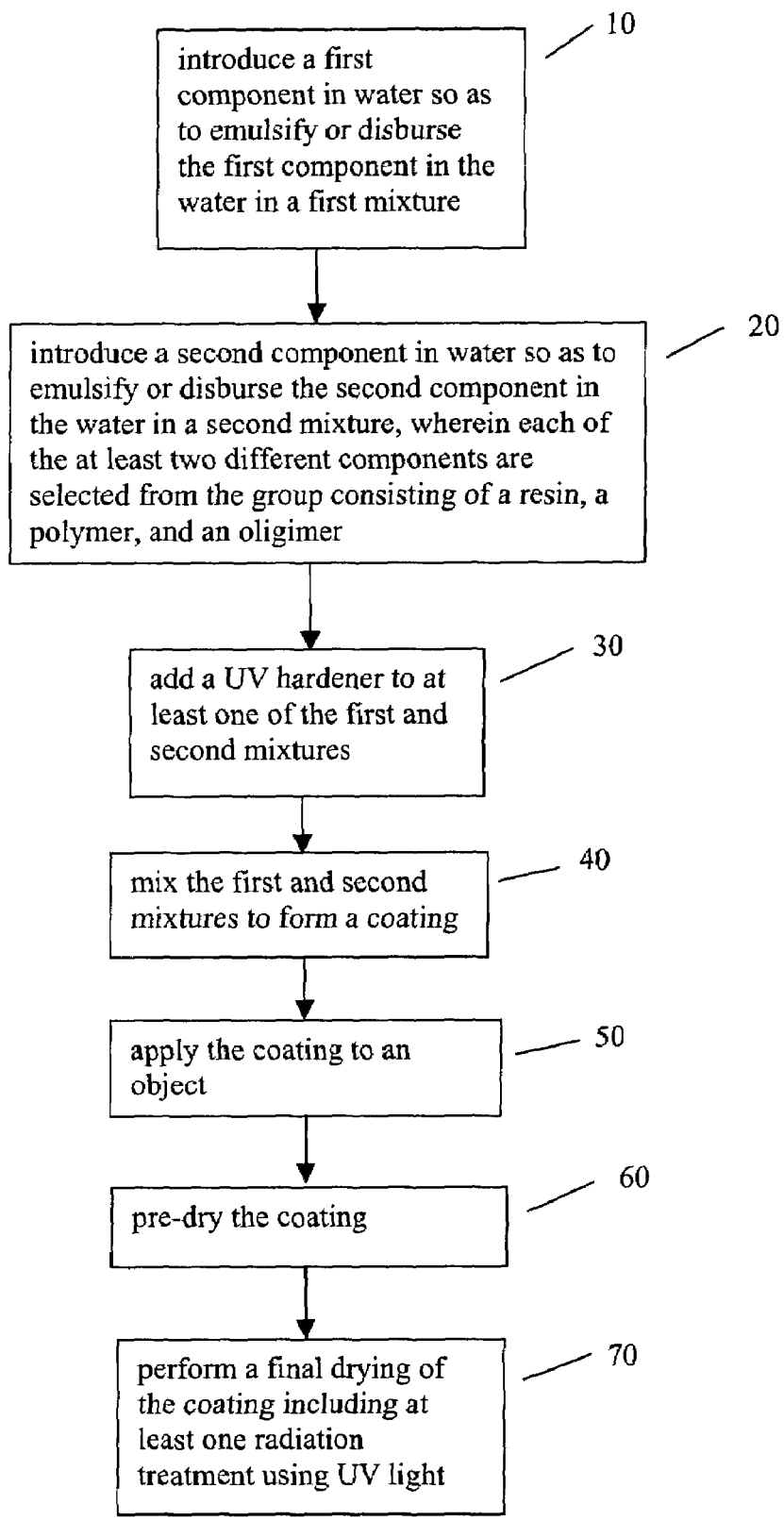
FIG. 1 shows a schematic flow chart of a method for manufacturing a self-coating or self-layering lacquer coating, according to the present invention.

FIG. 1 shows a method for manufacturing a self-coating or self-layering lacquer coating. In a first step, a first component in emulsified or disburse in water so as to form a first mixture. [Block 10]. A second component is emulsified or disbursed in water so as to form a second mixture, wherein each of the at least two different components are selected from the group consisting of a resin, a polymer, and an oligimer, [Block 20]. A UV hardener is added to at least one of the first and second mixtures. [Block 30]. The first and second mixtures are then mixed to form a coating. [Block 40]. The coating is then applied to an object. [Block 50]. The application to the object may be performed by doctor blading, pneumatically or electrically. The coating is then pre-dried. [Block 60]. Finally, the coating is finally dried by performing at least one radiation treatment using UV light. [Block 70].

EXAMPLE

One liter of the commercially available UV-hardenable clear lacquer UVHC 8558 by GE Bayer Silicones, a so-called 100% system based on silicone acrylates without any other solvent, was stirred into one liter of de-ionized water. Three wt %, referred to solid UVHC 8558, of the emulsifier Surfynol was added drop-wise, and the pH of the dispersion was adjusted to a value of 8.5 by addition of ammonia. Subsequently, the mixture was stirred for two hours. After that, one liter of a common water-based commercial lacquer, e.g., MB 9-744 (BASF Coatings) was stirred in with the previously prepared dispersion. The self-layering lacquer system may now be applied. The application may be carried out either with a doctor blade, pneumatically, or electrostatically. Following pneumatic application of the self-coating mixture onto sheet metal, it was exposed to air for five minutes and subsequently pre-dried for 30 minutes at 80° C. in a recirculated air oven. After that, UV hardening was carried out. With the aid of a conveyor belt the sheet was twice passed under a UV radiator by the company Fusion (H-Strahler) at a speed of 5 m/min to harden the UV lacquer. After that, the lacquer was firm to touch. A cross-section of the film examined under the microscope indicated the existence of two clearly developed films. Determination of surface energies by contact angle measurement of individual layers gave values of 39.75 mN/m for the water-based lacquer and 30.9 mN/m for the UVHC 8558 coating. The coating produced in the exemplary embodiment from the self-stratifying mixture had a surface tension equal to 30.95 mN/m on the top and a surface tension of 39.69 mN/m on the bottom. The element-specific analysis by ESCA showed that the upper film had strong bands on the top that without any doubt may be attributed to Si atoms. When the film was analyzed the signals did not appear. It was thus conclusively demonstrated that self-coating of the aqueous coating had occurred.

The coating compositions according to the present invention are environmentally friendly, have especially good self-stratifying properties in regard to kinetics, formation, and chemical engineering properties of the resulting multi-layered coatings.

What is claimed is:

1. A coating composition for formation of a self-layering or self-coating lacquer system, comprising:
at least two components selected from the group consisting of a resin, an oligomer, and a polymer, the at least two components being emulsified or dispersed in water and each of the at least two components having a different surface tension, wherein at least one of the at least two components is a UV-hardenable clear lacquer and wherein a difference in the surface tensions of the at least two components is greater than 5 mN/m.

2. The coating composition as recited in claim 1, wherein the at least two components are thermally dried or hardened by radiation.

3. The coating composition as recited in claim 2, wherein the at least two components are hardened by at least one of UV radiation, NIR radiation and IR radiation.

4. The coating composition as recited in claim 2, wherein the at least two components are dried by microwave drying.

5. The coating composition as recited in claim 1, wherein the resin and the polymer are selected from the group consisting of aminoplasts, epoxy resins, phenolic resins, polyurethane resins, polyester resins, polyvinyl acetate, amine resins, and alkyd resins.

6. The coating composition as recited in claim 5, wherein the alkyd resins include fluorine- or silicon-containing resins.

7. The coating composition as recited in claim 1, further comprising at least one starter for a radiation-induced radical polymerization.

8. The coating composition as recited in claim 1, wherein at least one of the at least two components has a surface tension lying in a range from 20 to 35 mN/m.

9. A lacquer coating produced from a coating composition as recited in claim 1, wherein one of the at least two components forms a clear lacquer coating having a thickness of 1 μm to 100 μm and wherein another of the at least two components forms a coloring coating having a thickness of 5 μm to 100 μm.

10. A lacquer coating, produced from a coating composition as recited in claim 1, wherein one of the at least two components forms a filler material layer and wherein another of the at least two components forms a base lacquer or a protective paint coat.

11. A method of coating a surface of an automobile part or component, the method comprising:

providing a coating composition according to claim 1;
using the coating composition to coat the surface of the automobile part or component.

12. A method for manufacturing a self-coating or self-layering lacquer coating, the method comprising:

introducing a first component in water so as to emulsify or disburse the first component in the water in a first mixture;

introducing a second component in water so as to emulsify or disburse the second component in the water in a second mixture, wherein each of the at least two different components are selected from the group consisting of a resin, a polymer, and an oligimer;

adding a UV hardener to at least one of the first and second mixtures;

mixing the first and second mixtures to form a coating;
applying the coating to an object;
pre-drying the coating; and
performing a final drying of the coating including at least one radiation treatment using UV light.

13. The method as recited in claim 12, wherein the applying is performed by doctor blading, electrostatically or pneumatically.

* * * * *